(12) United States Patent
Yoshimoto et al.

(10) Patent No.: US 11,946,124 B2
(45) Date of Patent: Apr. 2, 2024

(54) FE-BASED ALLOY FOR MELTING-SOLIDIFICATION SHAPING AND METAL POWDER

(71) Applicant: DAIDO STEEL CO., LTD., Nagoya (JP)

(72) Inventors: Takashi Yoshimoto, Nagoya (JP); Kosuke Tomiyama, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 0 days.

(21) Appl. No.: 17/953,945

(22) Filed: Sep. 27, 2022

(65) Prior Publication Data

US 2023/0106326 A1 Apr. 6, 2023

(30) Foreign Application Priority Data

Sep. 29, 2021 (JP) .................................. 2021-158883
Jun. 20, 2022 (JP) .................................. 2022-098774

(51) Int. Cl.
| | |
|---|---|
| *C22C 38/12* | (2006.01) |
| *B33Y 70/00* | (2020.01) |
| *C22C 38/02* | (2006.01) |
| *C22C 38/04* | (2006.01) |
| *C22C 38/10* | (2006.01) |

(52) U.S. Cl.
CPC .............. *C22C 38/12* (2013.01); *B33Y 70/00* (2014.12); *C22C 38/02* (2013.01); *C22C 38/04* (2013.01); *C22C 38/105* (2013.01)

(58) Field of Classification Search
None
See application file for complete search history.

(56) References Cited

U.S. PATENT DOCUMENTS

| 2004/0101431 A1 | 5/2004 | Ponemayr et al. |
| 2009/0007992 A1 | 1/2009 | Caliskanoglu et al. |
| 2021/0178467 A1 | 6/2021 | Kuse et al. |

FOREIGN PATENT DOCUMENTS

| CN | 110914008 A | 3/2020 |
| GB | 1 523 926 A | 12/1975 |
| JP | 2020-084286 A | 6/2020 |
| WO | WO 2020/110497 A1 | 6/2020 |

OTHER PUBLICATIONS

Extended European Search Report dated Feb. 2, 2023 for European Patent Application No. 22198338.0-1103.
Chinese Office Action 2022-11172432.1 dated Nov. 23, 2023 with English translation thereof.

*Primary Examiner* — Anthony M Liang
(74) *Attorney, Agent, or Firm* — MCGINN I.P. LAW GROUP, PLLC

(57) ABSTRACT

An Fe-based alloy for melting-solidification shaping including, in mass %: $18.0 \leq Co < 25.0$; $12.0 \leq Mo+W/2 \leq 20.0$; $0.2 \leq Mn \leq 5.0$; $0.5 \leq Ni \leq 10.0$; and $0 \leq Si \leq 1.0$, with the balance being Fe and unavoidable impurities, and satisfying the following expressions (1) and (2) when [M] represents a content of an element M expressed in mass % basis, $58 \leq [Co]+3([Mo]+[W]/2) \leq 95$ (1), $A/B \geq 1.6$ (2) where $A=[Co]+[Ni]+3[Mn]$, and $B=[Mo]+[W]/2+[Si]$, in which when the Fe-based alloy includes no Mo, the expressions (1) and (2) are calculated using $[Mo]=0$, when the Fe-based alloy includes no Si, the expression (2) is calculated using $[Si]=0$, and when the Fe-based alloy includes no W, the expressions (1) and (2) are calculated using $[W]=0$.

14 Claims, 1 Drawing Sheet

FE-BASED ALLOY FOR MELTING-SOLIDIFICATION SHAPING AND METAL POWDER

TECHNICAL FIELD

The present invention relates to an Fe-based alloy for melting-solidification shaping and a metal powder. More particularly, the present invention relates to an Fe-based alloy for melting-solidification shaping which, when used in melting-solidification shaping such as overlay welding or additive manufacturing, is less apt to crack during the shaping and gives a high-hardness shaped article, and to a metal powder having an average composition that is equivalent to the Fe-based alloy.

BACKGROUND ART

Molds for cold working or sliding members are required to have high wear resistance. In general, wear resistance correlates with hardness, and the higher the hardness, the better the wear resistance. Especially, examples of alloys attaining high hardness include high-speed tool steels, Co-based superalloys, and Ni-based superalloys. However, these alloys have a problem in that they have poor workability and removal of large-volume portions by machining hence results in severe tool wear and a cost increase.

In recent years, as a result of the development of additive manufacturing, it has become possible to form those materials, which are difficult to work, into shapes close to those of finished products. Various proposals have hence been made so far on metal powders for additive manufacturing.

For example, Patent Document 1 discloses an alloy powder including from 25 to 35 wt % of Co, from 10 to 17.5 wt % of Mo, and Fe.

Patent Document 1 states that in cases when an alloy powder having such a composition is subjected to additive manufacturing and the resultant shaped article is subjected to an aging treatment at from 400 to 700° C., then a hardness required of wear-resistant members is obtained.

Patent Document 2 discloses a tool (coated metal article) including: a body part obtained by subjecting an alloy powder (a carbon-free precipitation-hardened Fe—Co—Mo/W—N alloy powder) which, although not a metal powder for additive manufacturing, includes given amounts of Co, Mo, W, and N, with the remainder being Fe to an HIP treatment; and a coating formed on a surface of the body part by a PVD method or a CVD method.

Patent Document 2 states that in cases when the body part is produced by powder metallurgy method, a structure is obtained in which the individual phases are finely dispersed.

In an additive manufacturing process, a structure is formed through rapidly-cooling-solidification, and thermal stress occurs during the process. Because of this, there has been a problem in that in the case where the shaped article in the as-solidified state has insufficient toughness, this shaped article cracks due to the thermal stress during the process.

In this respect, Patent Document 1 discloses a powder for additive manufacturing which is possible to be subjected to a low-temperature aging treatment. However, there are cases where a ferrite phase is precipitated in the shaped article depending on component balance or cooling conditions when the alloy powder described in Patent Document 1 is applied to additive manufacturing. The portions where the ferrite phase has been precipitated do not come to have a martensite structure through cooling and are hence prone to include coarse crystal grains. This shaped article is prone to crack due to the thermal stress induced during the process. Furthermore, the alloy powder described in Patent Document 1 contains Co in a relatively large amount. Co has recently come to be in increased demand because of use thereof in lithium ion batteries, etc., and has poor availability and a high cost.

Meanwhile, the alloy powder described in Patent Document 2 is a powder intended to be shaped by HIP and is not a powder to be subjected to additive manufacturing. The alloy powder described in Patent Document 2 contains components (e.g., 25% of Co and 19.2% of Mo) which are causative of cracking when used in additive manufacturing.
Patent Document 1: JP-A-2020-084286
Patent Document 2: U.S. Patent Publication No. 2009/0007992

SUMMARY OF INVENTION

An object of the present invention is to provide an Fe-based alloy for melting-solidification shaping which, when used in melting-solidification shaping such as overlay welding or additive manufacturing, gives a shaped article less apt to have cracks and is capable of giving a high-hardness overlay weld layer, an additively manufacturing article, etc.

Another object of the present invention is to provide a metal powder having an average composition that is equivalent the Fe-based alloy for melting-solidification shaping.

An Fe-based alloy for melting-solidification shaping and metal powder of the present invention in order to solve the above-mentioned problems relate to the following configurations (1) to (4):

(1) An Fe-based alloy for melting-solidification shaping including:
  18.0 mass %≤Co<25.0 mass %;
  12.0 mass %≤Mo+W/2≤20.0 mass %;
  0.2 mass %≤Mn≤5.0 mass %;
  0.5 mass %≤Ni≤10.0 mass %; and
  0 mass %≤Si≤1.0 mass %,
  with the balance being Fe and unavoidable impurities,
  and satisfying the following expressions (1) and (2) when [M] represents a content of an element M expressed in mass % basis, $$58 \leq [Co] + 3([Mo] + [W]/2) \leq 95 \quad (1)$$

$$A/B \geq 1.6 \quad (2)$$

where $$A = [Co] + [Ni] + 3[Mn], \text{ and}$$

$$B = [Mo] + [W]/2 + [Si],$$

in which when the Fe-based alloy for melting-solidification shaping includes no Mo, the expressions (1) and (2) are calculated using [Mo]=0, when the Fe-based alloy for melting-solidification shaping includes no Si, the expression (2) is calculated using [Si]=0, and when the Fe-based alloy for melting-solidification shaping includes no W, the expressions (1) and (2) are calculated using [W]=0.

(2) The Fe-based alloy for melting-solidification shaping according to (1), in which the content of W is 0 mass % or higher and 20.0 mass % or less.

(3) The Fe-based alloy for melting-solidification shaping according to (1) or (2), in which the content of Mo is 10 mass % or more and 20.0 mass % or less.

(4) A metal powder having an average composition that is equivalent to the Fe-based alloy for melting-solidification shaping according to any one of (1) to (3).

In Fe—Co—Mo alloys, the Co has (a) the function of acting as an element which stabilizes the austenite phase and (b) the function of precipitating fine particles including an Fe—Co—Mo compound (μ phase) in the matrix during an aging treatment.

Because of this, a mere reduction of Co content for reducing the cost of the Fe-based alloys results not only in a decrease in the precipitated amount of the μ phase as a precipitation-strengthening phase but also in an increased tendency for a ferrite phase to precipitate during solidification. In the case where such an Fe-based alloy is applied to additive manufacturing, a martensite structure is not obtained after cooling when a ferrite phase is precipitated in the shaped article, resulting in coarse crystal grains. As a result, the shaped article is prone to crack.

In contrast, in the case where Ni and Mn are added in appropriate amounts while the content of Co is regulated to a minimum necessary amount, the precipitation of a ferrite phase during solidification is inhibited and the μ phase can be precipitated in an appropriate amount by an aging treatment. As a result, a powder including such an Fe-based alloy, when used in melting-solidification shaping such as overlay welding or additive manufacturing, can give a shaped article less apt to have cracks and is capable of giving a high-hardness overlay weld layer, an additively manufacturing object, etc.

DESCRIPTION OF EMBODIMENTS

Figure 1:
FIG. 1 is a photograph of a cross-section of the overlay portion obtained in Example 11, the cross-section being perpendicular to the weld-length direction.

Embodiments of the present invention are described in detail below.
[1. Fe-based Alloy for Melting-Solidification Shaping]
[1.1. Components]

The Fe-based alloy for melting-solidification shaping (hereinafter also referred to simply as "Fe-based alloy") according to the present invention includes the following elements, with the balance being Fe and unavoidable impurities. The kinds of additive elements, the ranges of contents of the components, and reasons for limiting the content ranges are as follows.
[1.1.1. Main Constituent Elements (Essential Components)]
(1) 18.0 mass %≤Co<25.0 mass %:

Co has the function of promoting the precipitation of the μ phase, which is a strengthening phase, and the function of enhancing the high-temperature stability of austenite. Because of this, in the case where the content of Co is too low, the precipitated amount of the μ phase is insufficient, resulting in a considerable decrease in hardness. Consequently, the content of Co needs to be 18.0 mass % or higher. The content of Co is preferably 20.0 mass % or higher, more preferably 22.0 mass % or higher, further preferably 23.0 mass % or higher.

Meanwhile, in the case where the content of Co is too high, not only the effect of heightening the hardness cannot be produced any more but also an increase in production cost results. Consequently, the content of Co needs to be less than 25.0 mass %. The content of Co is preferably 24.5 mass % or less.
(2) 12.0 mass %≤Mo+W/2≤20.0 mass %:

Mo and W, like Co, each have the function of promoting the precipitation of the μ phase, which is a strengthening phase, and the function of enhancing the high-temperature stability of austenite. Since the atomic weight of W is about two times that of Mo, the same effects are obtained even when all or some of the Mo is replaced with a two-fold amount of W. However, in the case where the (Mo+W/2) content is too low, the precipitated amount of the μ phase may be insufficient, making it impossible to obtain a high-hardness shaped article. Consequently, the (Mo+W/2) content needs to be 12.0 mass % or higher. The (Mo+W/2) content is preferably 14.0 mass % or higher.

Meanwhile, in the case where the (Mo+W/2) content is too high, this powder may give a shaped article having too high a μ-phase volume ratio and hence reduced toughness. Consequently, the (Mo+W/2) content needs to be 20.0 mass % or less. The (Mo+W/2) content is preferably 16.0 mass % or less.
(3) 0.2 mass %≤Mn≤5.0 mass %:

Mn has the function of acting as a deoxidizer and the function of inhibiting the formation of ferrite. Because of this, in the case where the content of Mn is too low, use of such a powder in melting-solidification shaping is prone to result in the precipitation of a ferrite phase during the shaping to give a shaped article having cracks. Consequently, the content of Mn needs to be 0.2 mass % or higher. The content of Mn is preferably 0.5 mass % or higher, more preferably 0.7 mass % or higher.

Meanwhile, in the case where the content of Mn is too high, this powder may give a shaped article containing retained austenite in an increased amount and having insufficient hardness. Consequently, the content of Mn needs to be 5.0 mass % or less. The content of Mn is preferably 3.0 mass % or less, more preferably 1.0 mass % or less.
(4) 0.5 mass %≤Ni≤10.0 mass %:

Ni has the function of inhibiting the formation of ferrite. Because of this, in the case where the content of Ni is too low, use of such a powder in melting-solidification shaping is prone to result in the precipitation of a ferrite phase during the shaping to give a shaped article having cracks. Consequently, the content of Ni needs to be 0.5 mass % or higher. The content of Ni is preferably 0.8 mass % or higher, more preferably 1.0 mass % or higher, further preferably 2.0 mass % or higher, and still further preferably 4.0 mass % or higher.

Meanwhile, in the case where the content of Ni is too high, this powder may give a shaped article containing retained austenite in an increased amount and having insufficient hardness. Consequently, the content of Ni needs to be 10.0 mass % or less. The content of Ni is preferably 8.0 mass % or less, more preferably 7.0 mass % or less.
[1.1.2. Minor Constituent Elements (Optional Components)]

Besides including the elements described above, the Fe-based alloy according to the present invention may further include one or more elements such as those shown below. The kinds of additive elements, the ranges of contents of the components, and reasons for limiting the content ranges are as follows.
(1) 0 mass %≤Si≤1.0 mass %:

Si has the function of acting as a deoxidizer and the function of promoting the precipitation of the μ phase, and can be added according to need.

However, in the case where the content of Si is too high, the precipitation of the μ phase is extremely promoted, and some of the μ phase is prone to crystallize out from the liquid phase. As a result, the shaped article may have impaired toughness. Consequently, the content of Si is preferably 1.0 mass % or less. The content of Si is more preferably 0.5 mass % or less, further preferably 0.3 mass % or less, still further preferably 0.25 mass % or less.

(2) 0 mass %≤W≤20.0 mass %:

As stated above, W, like Mo, has the function of promoting the precipitation of the μ phase, which is a strengthening phase, and the function of enhancing the high-temperature stability of austenite. All or some of Mo can hence be replaced with W. However, in the case where the content of W is too high, this powder may give a shaped article having too high a μ-phase volume ratio and hence reduced toughness. Consequently, the content of W is preferably 20.0 mass % or less. The content of W is more preferably 15.0 mass % or less, further preferably 10.0 mass % or less.

(3) 10.0 mass %≤Mo≤20.0 mass %:

As stated above, Mo, like W, has the function of promoting the precipitation of the μ phase, which is a strengthening phase, and the function of enhancing the high-temperature stability of austenite. All or some of the W can hence be replaced with Mo. However, in the case where the content of Mo is too low, the precipitated amount of the μ phase may be insufficient, making it impossible to obtain high hardness. Consequently, the content of Mo is preferably 10.0 mass % or higher. The content of Mo is more preferably 12.0 mass % or higher, further preferably 14.0 mass % or higher.

Meanwhile, in the case where the content of Mo is too high, this powder may give a shaped article having too high a μ-phase volume ratio and hence reduced toughness. Consequently, the content of Mo is preferably 20.0 mass % or less. The content of Mo is more preferably 16.0 mass % or less.

(4) P≤0.05 mass %:

P is an unavoidable impurity which comes into the alloy during the production. P segregates at grain boundaries to reduce the toughness of the shaped article. Consequently, the content of P is preferably 0.05 mass % or less. The content of P is more preferably 0.03 mass % or less. The lower the content of P, the more preferable.

(5) S≤0.05 mass %:

S is an unavoidable impurity which comes into the alloy during the production. S segregates at grain boundaries to reduce the toughness of the shaped article. Consequently, the content of S is preferably 0.05 mass % or less. The content of S is more preferably 0.03 mass % or less. The lower the content of S, the more preferable.

[1.1.3. Unavoidable Impurities]

In the Fe-based alloy according to the present invention, there are cases where the following components are contained in the following amounts. In such cases, these components are regarded as unavoidable impurities in the present invention.

Cr≤0.5 mass %, C≤0.1 mass %, Cu≤0.5 mass %, Al≤0.2 mass %, N≤0.1 mass %, O≤0.1 mass %, Sn≤0.05 mass %, Nb≤0.05 mass %, Ta≤0.05 mass %, Ti≤0.5 mass %, Zr≤0.05 mass %, B≤0.02 mass %, Ca≤0.01 mass %, Se≤0.03 mass %, Te≤0.03 mass %, Bi≤0.03 mass %, Pb≤0.05 mass %, Mg≤0.02 mass %, and REM (Rare Earth Metal)≤0.01 mass %.

[1.2. Component Balance]

The Fe-based alloy according to the present invention needs to satisfy the following expressions (1) and (2) when [M] represents a content of an element M expressed in mass % basis:

$$58 \leq [Co]+3([Mo]+[W]/2) \leq 95 \quad (1)$$

$$A/B \geq 1.6 \quad (2)$$

where $A=[Co]+[Ni]+3[Mn]$, and $B=[Mo]+[W]/2+[Si]$, in which when the Fe-based alloy for melting-solidification shaping includes no Mo, the expressions (1) and (2) are calculated using [Mo]=0, when the Fe-based alloy for melting-solidification shaping includes no Si, the expression (2) is calculated using [Si]=0, and when the Fe-based alloy for melting-solidification shaping includes no W, the expressions (1) and (2) are calculated using [W]=0

[1.2.1. Expression (1)]

"[Co]+3([Mo]+[W]/2)" is an index (hereinafter referred to also as "index C") to μ-phase precipitation amount. In the case where the index C is too small, high hardness is not obtained. Consequently, the index C needs to be 58 or larger. The index C is preferably 61 or larger, more preferably 64 or larger.

Meanwhile, in the case where the index C is too large, this powder may give a shaped article having too high a μ-phase volume ratio and having considerably impaired toughness. Consequently, the index C needs to be 95 or less. The index C is preferably 85 or less, more preferably 80 or less.

[1.2.2. Expression (2)]

"A" in expression (2) represents the equivalent amount of austenite-phase-stabilizing elements.

"B" in expression (2) represents the equivalent amount of a ferrite-phase-stabilizing element.

"A/B" (hereinafter referred to also as "equivalent ratio") in expression (2) represents the ratio of the equivalent amount of the austenite-phase-stabilizing elements to the equivalent amount of the ferrite-phase-stabilizing element.

In the case where the equivalent ratio is too small, when such a powder is applied to melting-solidification shaping, cracks are prone to occur in a shaped article because ferrite grain boundaries are served as starting point for cracks. Consequently, the equivalent ratio needs to be 1.6 or larger. The equivalent ratio is preferably 1.7 or larger.

Meanwhile, in the case where the equivalent ratio is too large, this powder may give a shaped article having an increased retained-austenite content and reduced hardness. Consequently, the equivalent ratio is preferably less than 2.4. The equivalent ratio is more preferably 2.2 or less.

[1.3. Shape]

In the present invention, the Fe-based alloy is not particularly limited in its shape. Examples of the shape of the Fe-based alloy include a mass, a rod, a pipe, a wire, and a powder. The powder is especially suitable for materials for melting-solidification shaping.

[2. Metal Powder]

The metal powder according to the present invention includes a metal powder having an average composition that is equivalent to the Fe-based alloy for melting-solidification shaping according to the present invention. The metal powder preferably has an average particle diameter of 10 μm or larger and 300 μm or smaller.

[2.1. Components]

The expression "average composition that is equivalent to the Fe-based alloy for melting-solidification shaping" means that: (a) the metal powder is constituted of a group of metal particles of one kind which have the same composition and the composition of each metal particle is within the range described above; (b) the metal powder is constituted of a mixture of metal particles of two or more kinds differing in composition and the metal particles each have component contents within the range described above; or (c) the metal powder is constituted of a mixture of metal particles of two or more kinds of differing in composition, in which one or two or more kinds of metal particles have component contents outside the ranges described above but the metal powder as a whole has an average composition having component contents within the ranges described above.

In the case where the metal powder is constituted of a mixture of metal particles of two or more kinds differing in composition, the individual metal particles may be pure-metal particles each constituting of a single metallic element or may be alloy particles each including two or more metallic elements. In the case where the metal powder is constituted of a mixture, an average composition thereof is obtained, for example, by extracting about 10 g of a sample from the mixture and analyzing the sample by a method such as fluorescent X-ray analysis, combustion-infrared absorption method, or plasma emission spectrometry.

Details of the composition (average composition) of the metal powder are the same as in the Fe-based alloy described above, and explanations thereon are hence omitted.

[2.2. Average Particle Diameter]

The term "average particle diameter" means number frequency $D_{50}$ (μm), that is, the 50% number-cumulative particle diameter (median diameter) of the powder. Examples of methods for determining $D_{50}$ include (a) a method in which a particle distribution analyzer based on the laser diffraction/scattering method is used, (b) a method in which a particle image analyzer is used, and (c) a method in which a Coulter counter is used.

The "$D_{50}$" as used in the present invention means median diameter determined with a particle distribution analyzer based on a laser diffraction/scattering method.

The average particle diameter and particle size distribution of the metal powder can be controlled by regulating conditions for producing a metal powder and conditions for classification for the metal powder.

In melting-solidification shaping using a metal powder, there are cases where a nozzle is used to feed the metal powder to a shaping zone. In this case, in the case where the metal powder has too small average particle diameter, this metal powder has reduced flowability and may be difficult to be fed stably into the shaping zone. Consequently, the average particle diameter of the metal powder is preferably 10 μm or larger. The average particle diameter thereof is more preferably 50 μm or larger, further preferably 80 μm or larger.

Meanwhile, in the case where the metal powder has too large average particle diameter, there are cases where the nozzle is clogged by particles having large diameters, making it impossible to stably feed the powder into the shaping zone. Consequently, the average particle diameter of the metal powder is preferably 300 μm or less. The average particle diameter thereof is more preferably 200 μm or less, further preferably 150 μm or less.

[2.3. Shape of Particles]

The shape of the individual metal particles included in the metal powder is not particularly limited. The metal particles may be spherical particles or irregular shapes. From the standpoint of obtaining high flowability, the metal particles are preferably spherical particles.

[2.4. Surface Coating]

The metal particles may be ones in which the surface thereof is coated with Nanoparticles. The term "nanoparticles" means particles of an inorganic compound which each have a diameter of 1 nm or more and 100 nm or less.

The nanoparticles may be optionally added to the metal powder in order to coat the metal particles. In the present application, the composition of the metal powder described above means the composition excluding the nanoparticles.

There are cases where coating the surface of metal particles with nanoparticles of some kind can inhibit the metal particles from agglomerating. Examples of nanoparticles which can serve to inhibit the agglomeration of metal particles include metal oxides such as silica ($SiO_2$), alumina ($Al_2O_3$), manganese oxide (MnO), iron oxide ($Fe_2O_3$), calcium oxide (CaO), and magnesium oxide (MgO).

In the case of coating the surface of metal particles with nanoparticles, too small amount of the nanoparticles used for coating may make it impossible to sufficiently inhibit the agglomeration of the metal particles. Consequently, the content of the nanoparticles is preferably 0.005 mass % or higher in the metal powder.

Meanwhile, in the case where the amount of the nanoparticles used for coating is too large, the nanoparticles may serve as inclusion particles, in performing melting-solidification shaping, to reduce the strength and/or the toughness of the shaped article. Consequently, the content of the nanoparticles is preferably 0.05 mass % or less in the metal powder.

[2.5. Uses]

The metal powder according to the present invention can be used as a powdery raw material for melting-solidification shaping.

The term "melting-solidification shaping method" herein means a method in which a metal powder is melted using any of various heat sources and the molten metal powder is solidified and deposited to thereby form the whole or a portion of a shaped article.

The expression "form the whole or a portion of a shaped article" means that the whole of a shaped article is formed only by melting, solidifying, and depositing a metal powder.

The expression "form a portion of a shaped article" means that on a surface of a base material constituting a portion a shaped article, a new layer for constituting another portion of the shaped article is superposed by melting, solidifying, and depositing a metal powder (for example, repair of a mold).

Representative examples of methods for the melting-solidification shaping include (a) a direct energy deposition (DED) method, (b) a powder bed melting method, and (c) a plasma overlay welding method.

Of these methods, the "direct energy deposition (DED) method" is a method in which a metal powder that is being continuously fed is irradiated with a laser or electron beam and the resultant molten metal is selectively deposited on a base material, for example, an existing member or a substrate. In the DED method, a metal layer can be repeatedly deposited and overlay having any of various shapes including a linear shape, a wall shape, and a massive shape can be formed. By using a device employing a laser as a heat source, the volume of a melt to be deposited can be reduced and a decrease in quality due to component mixing, which occurs at the interface between the melt to be deposited and the base material, can be diminished. Because of this, various materials including Fe-based alloys, Ni-based alloys, and Co-based alloys can be used as the base metal for overlay welding.

The "powder bed melting method" is a method in which data on slices of tens of micrometers are produced on the basis of three-dimensional shape data (e.g., STL data) produced with a 3D-CAD or the like, and a powder bed is selectively irradiated with a laser while scanning the laser using the obtained slice data, thereby forming a sintered layer and the obtained sintered layers are stacked with each other.

The "plasma overlay welding method" is a method in which a plasma arc is generated between an electrode and a base material, and a metal powder is introduced thereinto and melted to thereby pile up the metal on the surface of the base material.

[3. Methods for Producing the Metal Powder]

The metal powder according to the present invention can be produced by using methods such as a gas atomization method, a water atomization method, a plasma atomization method, a plasma/rotating electrode method, or a centrifugal atomization method. Use may be also made of a combination of methods, in which a powder obtained by any of these methods is subjected to a spheroidizing treatment with a reducing thermal plasma.

Of these methods, the "gas atomization method" is a method in which raw materials for an alloy are melted with, for example, an induction-melting furnace and the melt is being caused to fall from the bottom of a tundish, a high-pressure gas is blown against the melt to pulverize and solidify the melt, thereby obtaining a metal powder. As the high-pressure gas, use can be made of an inert gas such as nitrogen, argon, or helium. Gas atomization conditions are not particularly limited, and optimal conditions can be selected in accordance with purposes.

It is preferable that after a metal powder has been produced by using the gas atomization method, the metal powder is classified to regulate the average particle diameter and the particle size distribution. Examples of means for the classification include a dry cyclone, a wet cyclone, dry sieves, and ultrasonic sieves. In the case where the metal powder having a regulated average particle diameter and a regulated particle size distribution is applied to melting-solidification shaping, a dense shaped article can be obtained.

Furthermore, component regulation may be conducted according to need by mixing two or more kinds of metal powders differing in composition.

[4. Effects]

In Fe—Co—Mo alloys, the Co has (a) the function of acting as an element which stabilizes the austenite phase and (b) the function of precipitating fine particles including an Fe—Co—Mo compound (μ phase) in the matrix during an aging treatment.

Because of this, a mere reduction of Co content for reducing the cost of the Fe-based alloys results not only in a decrease in the precipitated amount of the μ phase as a precipitation-strengthening phase but also in an increased tendency for a ferrite phase to precipitate during solidification. In the case where such an Fe-based alloy is applied to additive manufacturing a martensite structure is not obtained after cooling when a ferrite phase is precipitated in the shaped article, resulting in coarse crystal grains. As a result, the shaped article is prone to crack.

In contrast, in the case where Ni and Mn are added in appropriate amounts while the content of Co is regulated to a minimum necessary amount, the precipitation of a ferrite phase during solidification is inhibited and the μ phase can be precipitated in an appropriate amount by an aging treatment. As a result, a powder including such an Fe-based alloy, when used in melting-solidification shaping such as overlay welding or additive manufacturing, can give a shaped article less apt to have cracks and is capable of giving a high-hardness overlay weld layer, an additively manufacturing object, etc.

EXAMPLES

Examples 1 to 10, Comparative Examples 1 to 7

[1. Production of Specimens]
[1.1. Production of Metal Powders]

Using the gas atomization method, 17 kinds of metal powders shown in Table 1 were produced. There are cases where elements not shown in the table were contained as impurities in amounts within the specified ranges.

TABLE 1

| No. | Composition (mass %) | | | | | | | | | [Co] + 3([Mo] + [W]/2) | A/B | [Co] + [Ni] + 3[Mn] | [Mo] + [W]/2 + [Si] |
|---|---|---|---|---|---|---|---|---|---|---|---|---|---|
| | Co | Mo | W | Mo + W/2 | Ni | Mn | Si | P | S | | | | |
| Comparative Example 1 | 22.2 | 15.0 | | 15.0 | 0.02 | 0.10 | 0.20 | | | 67.2 | 1.5 | 22.5 | 15.2 |
| Comparative Example 2 | 26.0 | 16.0 | | 16.0 | | | | | | 74.0 | 1.6 | 26.0 | 16.0 |
| Comparative Example 3 | 15.0 | 13.2 | | 13.2 | 9.90 | | | | | 54.6 | 1.9 | 24.9 | 13.2 |
| Comparative Example 4 | 23.9 | 9.9 | | 9.9 | 2.00 | | | | | 53.6 | 2.6 | 25.9 | 9.9 |
| Comparative Example 5 | 21.0 | 16.2 | | 16.2 | | 6.04 | | | | 69.6 | 2.4 | 39.1 | 16.2 |
| Comparative Example 6 | 23.1 | 16.6 | 8.0 | 20.6 | 0.40 | | | | | 84.9 | 1.1 | 23.5 | 20.6 |
| Comparative Example 7 | 20.1 | 12.2 | | 12.2 | | 0.20 | 1.50 | | | 56.7 | 1.5 | 20.7 | 13.7 |
| Example 1 | 21.8 | 14.2 | | 14.2 | 2.07 | 0.21 | 0.25 | | | 64.4 | 1.7 | 24.5 | 14.5 |
| Example 2 | 24.1 | 16.1 | | 16.1 | 3.96 | 0.38 | 0.19 | 0.02 | 0.01 | 72.4 | 1.8 | 29.2 | 16.3 |
| Example 3 | 20.9 | 13.8 | 3.8 | 15.7 | 9.16 | 0.78 | 0.30 | | | 68.0 | 2.0 | 32.4 | 16.0 |
| Example 4 | 24.2 | 17.2 | | 17.2 | 2.99 | 1.00 | 0.02 | | | 75.8 | 1.8 | 30.2 | 17.2 |
| Example 5 | 23.0 | 15.5 | | 15.5 | 0.51 | 0.81 | 0.15 | 0.01 | 0.02 | 69.5 | 1.7 | 25.9 | 15.7 |
| Example 6 | 21.8 | 15.0 | | 15.0 | 8.12 | 0.34 | | | | 66.8 | 2.1 | 30.9 | 15.0 |

TABLE 1-continued

| | Composition (mass %) | | | | | | | | | [Co] + 3([Mo] + [W]/2) | A/B | [Co] + [Ni] + 3[Mn] | [Mo] + [W]/2 + [Si] |
|---|---|---|---|---|---|---|---|---|---|---|---|---|---|
| No. | Co | Mo | W | Mo + W/2 | Ni | Mn | Si | P | S | | | | |
| Example 7 | 21.0 | 10.1 | 10.2 | 15.2 | 4.11 | 1.97 | 0.05 | | | 66.6 | 2.0 | 31.0 | 15.3 |
| Example 8 | 20.1 | 15.1 | 2.2 | 16.2 | 3.90 | 0.78 | 0.60 | | | 68.7 | 1.6 | 26.3 | 16.8 |
| Example 9 | 23.9 | 14.1 | | 14.1 | 0.50 | 0.60 | 0.22 | | | 66.2 | 1.8 | 26.2 | 14.3 |
| Example 10 | 23.5 | 12.0 | | 12.0 | 4.80 | 0.91 | 0.12 | | 0.01 | 59.5 | 2.6 | 31.0 | 12.1 |

* Each blank indicates below 0.01 mass %.

[1.2. Production of Overlay Shaped Articles]

Shaped articles for examining hardness and structure were produced using the produced metal powders and a DED-mode laser device for metal additive manufacturing (3D metal printer). As a substrate was used an JIS-SKD61 (JIS G 4404:2015) flat plate (50 mm×70 mm×10 mm). Conditions for the shaping are as follows. The shaping conditions were appropriately regulated so as to obtain a density of 98% or higher.

Laser output: 1,500 W to 2,000 W
Powder flow rate: 5 g/min to 10 g/min
Travel speed: 100 mm/min to 1,000 mm/min
Dimensions of shaped article: 5 mm to 10 mm (height)× 10 mm to 12 mm (width)×60 mm to 70 mm (length)

[2. Test Methods]
[2.1. Cracks]

Each shaped article was subjected to a liquid penetrant test to examine whether there were cracks in the shaped article or at the interface between itself and the substrate.

[2.2. Hardness 1 (As-shaped Hardness)]

Each shaped article was cut into a thickness of 5 mm, and the section was polished with polishing paper. A center portion of the section of the shaped article was examined for Rockwell hardness (JIS Z2245:2021).

[2.3. Hardness 2 (Hardness after Aging Treatment)]

Each shaped article was cut into a thickness of 5 mm The specimen obtained by cutting was introduced into an atmospheric furnace heated at 600° C., held therein for 30 minutes, and then air-cooled. This operation is referred to also as "aging treatment". The oxide coating film of the air-cooled specimen was removed with polishing paper, and a center portion of this section of the shaped article was then examined for Rockwell hardness (JIS Z2245:2021).

[3. Results]

The results are shown in Table 2, from which the following can be seen.

(1) In Comparative Examples 1, 6, and 7, cracks were observed in the shaped articles. This is thought to be because the values of A/B were less than 1.6 and this was causative of the occurrence of cracks at ferrite grain boundaries.

(2) In Comparative Example 2, no cracks were observed and the hardness was high. However, because of the large Co addition amount, the production cost was high.

(3) In Comparative Examples 3 and 4, the hardness after aging treatment (hardness 2) was low. This is thought to be because the values of [Co]+3([Mo]+[W]/2) were less than 58 and this resulted in an insufficient precipitated amount of µ phase.

(4) In Comparative Example 5, the hardness after aging treatment (hardness 2) was low. This is thought to be because the Mn content was too high and the structure hence included retained austenite, which is soft, in a large amount.

(5) Examples 1 to 10 each had no cracks and had a high hardness after aging treatment (hardness 2).

TABLE 2

| No. | Hardness 1 | Hardness 2 | Cracks |
|---|---|---|---|
| Comparative Example 1 | 37 | 64 | present |
| Comparative Example 2 | 40 | 68 | absent |
| Comparative Example 3 | 21 | 55 | absent |
| Comparative Example 4 | 31 | 57 | absent |
| Comparative Example 5 | 33 | 54 | absent |
| Comparative Example 6 | 36 | 69 | present |
| Comparative Example 7 | 57 | 55 | present |
| Example 1 | 37 | 62 | absent |
| Example 2 | 41 | 69 | absent |
| Example 3 | 39 | 64 | absent |
| Example 4 | 38 | 68 | absent |
| Example 5 | 38 | 66 | absent |
| Example 6 | 33 | 64 | absent |
| Example 7 | 33 | 64 | absent |
| Example 8 | 43 | 63 | absent |
| Example 9 | 39 | 65 | absent |
| Example 10 | 35 | 62 | absent |

Example 11, Comparative Example 8

[1. Production of Specimens]

Using a vacuum induction melting furnace, 5-kg steel ingots respectively having the compositions shown in Table 3 were produced. The steel ingots were heated at 1,200° C. for 5 hours and then forged so as to result in cross-sectional dimensions of 30 mm×30 mm. A round bar having a diameter of 1.6 mm was cut out of each forged steel piece by wire electrical discharge machining to obtain a welding rod for a welding test.

TABLE 3

| | Composition (mass %) | | | | | | | | |
|---|---|---|---|---|---|---|---|---|---|
| No. | Co | Mo | W | Mo + W/2 | Ni | Mn | Si | P | S |
| Comparative Example 8 | 25.1 | 15.0 | | 15.0 | | | | 0.002 | 0.001 |
| Example 11 | 24.0 | 15.1 | | 15.1 | 5.1 | 0.70 | 0.25 | 0.02 | 0.02 |

TABLE 3-continued

| No. | [Co] + 3([Mo] + [W]/2) | A/B | [Co] + [Ni] + 3[Mn] | [Mo] + [W]/2 + [Si] |
|---|---|---|---|---|
| Comparative Example 8 | 70.1 | 1.7 | 25.1 | 15.0 |
| Example 11 | 69.3 | 2.0 | 31.2 | 15.4 |

* Each blank indicates below 0.01 mass %.

Next, the obtained welding rods were used to conduct overlay welding on an JIS-SKD61 (JIS G 4404:2015) flat plate by a TIG welding method. Conditions for the TIG overlay welding are as follows.

Welding current: about 100 A
Wire insertion direction: forward
Gas flow rate: about 5 L/min to 10 L/min (Ar)
Weld length: 50 mm
Number of welding operations: (three width-direction passes/one layer)×(five height-direction layers)
Degree of overlap between passes: 50% (desired)
Cooling between layers: After completion of overlay welding of an n-th layer (1≤n≤4), the overlay portion was allowed to cool to a temperature of 150° C. or lower, and then overlay welding of an (n+1)th layer was conducted.
Preheating: not performed
Weaving: not performed

[2. Teat Method]

Each overlay shaped article was cut along a direction perpendicular to the weld-length direction, embedded in a resin, and machine-polished until the surface became a mirror surface. Next, the polished mirror surface was subjected to a Vickers hardness test.

In FIG. 1 is shown a photograph of the cross-section of the overlay portion obtained in Example 11, the cross-section being perpendicular to the weld-length direction. In FIG. 1, a left-hand region, a center region, and a right-hand region correspond to overlay weld regions deposited respectively by the first pass, second pass, and third pass. Vickers hardness was measured at positions (positions indicated by the dashed line of FIG. 1) located at a half of the weld-height direction, at intervals of 0.5 mm along the weld-width direction (direction of the dashed line of FIG. 1).

[3. Results]

Figure 2:
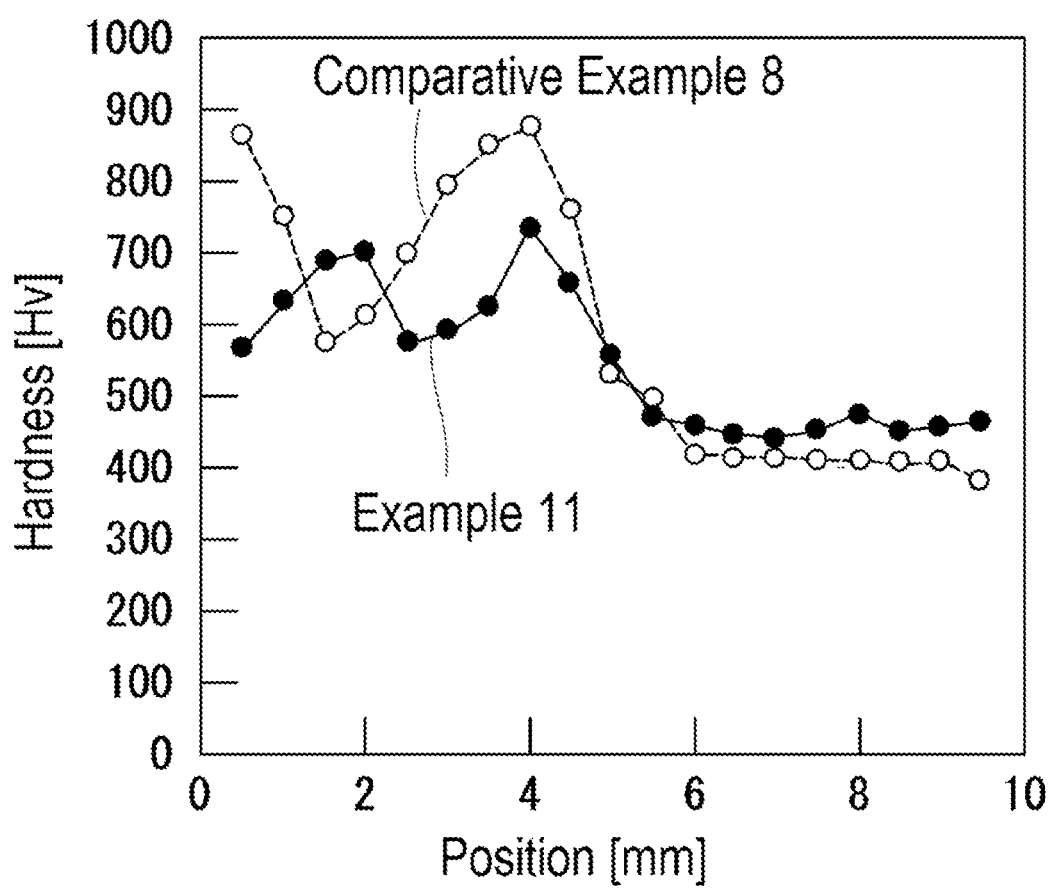
FIG. 2 is a diagram showing relationships between width-direction position and hardness in the overlay portions obtained in Example 11 and Comparative Example 8.

FIG. 2 shows relationships between width-direction position and hardness in the overlay portions obtained in Example 11 and Comparative Example 8. Incidentally, "position=0 mm" on the abscissa of FIG. 2 corresponds to the position of the left-hand end of the dashed line of FIG. 1. In Comparative Example 8, the heat-affected zone (region lying over 0 mm to 5 mm in position) had high hardnesses and included regions having a hardness exceeding 800 Hv. This is thought to be because the regions where martensite had been yielded as a result of first-pass overlay welding was reheated during second-pass overlay welding and age-hardened thereby.

In contrast, Example 11, although substantially equal to Comparative Example 8 in Co content and Mo content, which considerably affect the hardness after heat treatment, was lower in the hardness of the heat-affected zone than Comparative Example 8. This is thought to be because Ni had been added in an appropriate amount and this had lowered the martensitic-transformation initiation temperature (Ms). Namely, it is thought that due to the lowered Ms, second-pass overlay welding was conducted before the martensitic transformation of the overlay portion formed by the first pass could be completed and that age hardening was thereby suppressed.

Example 11 and Comparative Example 8 each had hardnesses of 600 Hv or less at positions of 5 mm to 10 mm This is thought to be because these positions lay in a portion corresponding to the third pass for the final fifth layer and the portion, after having been deposited, underwent no thermal influence and hence no age hardening occurred at the portions.

While embodiments of the present invention have been described in detail, the present invention is not limited to the embodiments in any way. The embodiments can be variously modified unless the modifications depart from the spirit of the present invention.

The present application is based on Japanese Patent Applications No. 2021-158883 filed on Sep. 29, 2021 and No. 2022-098774 filed on Jun. 20, 2022, and the contents thereof are incorporated herein by reference.

The metal powder according to the present invention can be used as a powder raw material for producing or repairing portions or parts required to have wear resistance, such as molds and sliding members, by additive manufacturing or overlay welding.

Furthermore, the Fe-based alloy according to the present invention, owing to the properties thereof, is also suitable for use as a wire for welding or additive manufacturing.

What is claimed is:

1. An Fe-based alloy for melting-solidification shaping consisting of:
   18.0 mass %≤Co<25.0 mass %;
   12.0 mass %≤Mo≤20.0 mass %;
   0.2 mass %≤Mn≤5.0 mass %;
   4.11 mass %≤Ni≤10.0 mass %; and
   0 mass %≤Si≤1.0 mass %,
   with the balance being Fe and unavoidable impurities,
   and satisfying the following expressions (1) and (2), where [M] represents a content of an element M expressed in mass % basis, $$58 \leq [Co] + 3[Mo] \leq 95 \tag{1}$$

$$A/B \geq 1.6 \tag{2}$$

where $$A = [Co] + [Ni] + 3[Mn], \text{ and}$$

$$B = [Mo] + [Si],$$

wherein, based on the Fe-based alloy for melting-solidification shaping comprising no Si, the expression (2) is calculated using [Si]=0.

2. The Fe-based alloy for melting-solidification shaping according to claim 1, wherein the content of Mo is 14.0 mass % or more and 16.0 mass % or less.

3. The Fe-based alloy for melting-solidification shaping according to claim 1, wherein the content of Co is 20.0 mass % or higher and 24.5 mass % or less.

4. The Fe-based alloy for melting-solidification shaping according to claim 1, wherein the content of Co is 22.0 mass % or higher and 24.5 mass % or less.

5. The Fe-based alloy for melting-solidification shaping according to claim 1, wherein the content of Co is 23.0 mass % or higher and 24.5 mass % or less.

6. The Fe-based alloy for melting-solidification shaping according to claim 1, wherein the Mo content is 14.0 mass %≤Mo≤20.0 mass %.

7. The Fe-based alloy for melting-solidification shaping according to claim 1, wherein the content of Mn is 0.5 mass % or higher and 3.0 mass % or less.

8. The Fe-based alloy for melting-solidification shaping according to claim 1, wherein the content of Mn is 0.7 mass % or higher and 1.0 mass % or less.

9. The Fe-based alloy for melting-solidification shaping according to claim 1, wherein the content of Ni is 4.11 mass %≤Ni≤8.0 mass %.

10. The Fe-based alloy for melting-solidification shaping according to claim 1, wherein the content of Ni is 4.11 mass %≤Ni≤7.0 mass %.

11. The Fe-based alloy for melting-solidification shaping according to claim 1, wherein the content of Ni is 4.11 mass %≤Ni≤5.1 mass %.

12. The Fe-based alloy for melting-solidification shaping according to claim 1, wherein A/B holds a ratio such that 1.7≤A/B≤2.4.

13. An Fe-based alloy for melting-solidification shaping consisting of:
S≤0.05 mass %;
P≤0.05 mass %;
18.0 mass %≤Co<25.0 mass %;
12.0 mass %≤Mo≤20.0 mass %;
0.2 mass %≤Mn≤5.0 mass %,
4.11 mass %≤Ni≤10.0 mass %, and
0 mass %≤Si≤1.0 mass %,
with the balance being Fe and unavoidable impurities,
and satisfying the following expressions (1) and (2), where [M] represents a content of an element M expressed in mass % basis, $$58 \leq [Co]+3[Mo] \leq 95 \quad (1)$$

$$A/B \geq 1.6 \quad (2)$$

where $$A=[Co]+[Ni]+3[Mn], \text{ and}$$

$$B=[Mo]+[Si],$$

wherein, based on the Fe-based alloy for melting-solidification shaping comprising no Si, the expression (2) is calculated using [Si]=0.

14. The Fe-based alloy for melting-solidification shaping according to claim 13, wherein the Mo content is 14.0 mass %≤Mo≤16.0 mass %.

* * * * *